US010780892B2

(12) United States Patent
Godet et al.

(10) Patent No.: US 10,780,892 B2
(45) Date of Patent: Sep. 22, 2020

(54) METHOD FOR DETERMINING THE MOVEMENT OF A MOTOR VEHICLE PROVIDED WITH A SYSTEM FOR MONITORING THE PRESSURE OF A TIRE

(71) Applicants: Continental Automotive France, Toulouse (FR); Continental Automotive GmbH, Hannover (DE)

(72) Inventors: Sylvain Godet, Saint-Cezert (FR); Stéphane Billy, Grenade (FR)

(73) Assignees: Continental Automotive France (FR); Continental Automotive GmbH (DE)

( * ) Notice: Subject to any disclaimer, the term of this patent is extended or adjusted under 35 U.S.C. 154(b) by 0 days.

(21) Appl. No.: 16/489,386

(22) PCT Filed: May 17, 2018

(86) PCT No.: PCT/FR2018/051196
§ 371 (c)(1),
(2) Date: Aug. 28, 2019

(87) PCT Pub. No.: WO2018/215714
PCT Pub. Date: Nov. 29, 2018

(65) Prior Publication Data
US 2019/0375417 A1 Dec. 12, 2019

(30) Foreign Application Priority Data

May 23, 2017 (FR) ...................... 17 54550

(51) Int. Cl.
*B60W 40/105* (2012.01)
*B60C 23/04* (2006.01)
(Continued)

(52) U.S. Cl.
CPC ........... *B60W 40/105* (2013.01); *B60C 23/04* (2013.01); *B60C 23/0477* (2013.01);
(Continued)

(58) Field of Classification Search
CPC ............... B60W 40/105; B60W 40/10; B60W 2050/0057; B60W 2420/60;
(Continued)

(56) References Cited

U.S. PATENT DOCUMENTS 5,274,355 A * 12/1993 Galan ................. B60C 23/0408
116/34 R
6,378,360 B1 4/2002 Bartels
(Continued)

FOREIGN PATENT DOCUMENTS

WO  9745277 A1  12/1997
WO  0240331 A1  5/2002

OTHER PUBLICATIONS

International Search Report and Written Opinion for International Application No. PCT/FR2018/051196, dated Sep. 11, 2018—7 pages.
(Continued)

*Primary Examiner* — Russell Frejd
(74) *Attorney, Agent, or Firm* — RatnerPrestia

(57) ABSTRACT

A method for determining the start of movement of a motor vehicle equipped with a system for monitoring tire pressure of a motor vehicle. Communication between the receiver and each pressure monitoring system emitter being subjected to a Doppler effect so that a periodic component is inserted by the emitter into the signal emitted to the receiver. The method includes: acquiring the intermediate-frequency signal before demodulation by a processor to extract data carried by the radiofrequency signal, determining the FFT of the IF signal, determining the average value of the FFT of the IF signal over a preset duration, and determining whether there is a frequency deviation by comparing the instantaneous value of the fast Fourier transform to the average value of the fast Fourier transform, if so, determining
(Continued)

whether the emitter for monitoring the pressure of a tire is moving and that the vehicle is moving.

7 Claims, 4 Drawing Sheets

(51) Int. Cl.
*G01S 11/10* (2006.01)
*B60W 40/10* (2012.01)
*B60W 50/00* (2006.01)

(52) U.S. Cl.
CPC .............. *B60W 40/10* (2013.01); *G01S 11/10* (2013.01); *B60W 2050/0057* (2013.01); *B60W 2420/60* (2013.01); *B60W 2530/20* (2013.01)

(58) Field of Classification Search
CPC ............... B60W 2530/23; B60C 23/04; B60C 23/0477; G01S 11/10
See application file for complete search history.

(56) References Cited

U.S. PATENT DOCUMENTS

| | | | | |
|---|---|---|---|---|
| 6,988,026 | B2 * | 1/2006 | Breed | G07C 5/008 |
| | | | | 701/31.4 |
| 7,032,443 | B2 * | 4/2006 | Moser | B60C 23/0425 |
| | | | | 73/146.5 |
| 7,089,099 | B2 * | 8/2006 | Shostak | B60C 23/005 |
| | | | | 701/29.6 |
| 7,421,321 | B2 * | 9/2008 | Breed | B60C 11/24 |
| | | | | 340/442 |
| 2003/0214419 | A1 | 11/2003 | Reindl | |
| 2011/0308310 | A1 | 12/2011 | Strahan | |

OTHER PUBLICATIONS

English Translation of the Written Opinion for International Application No. PCT/FR2018/051196, dated Sep. 11, 2018, 5 pages.

* cited by examiner

PRIOR ART

METHOD FOR DETERMINING THE MOVEMENT OF A MOTOR VEHICLE PROVIDED WITH A SYSTEM FOR MONITORING THE PRESSURE OF A TIRE

CROSS REFERENCE TO RELATED APPLICATIONS

This application is the U.S. National Phase Application of PCT International Application No. PCT/FR2018/051196, filed May 17, 2018, which claims priority to French Patent Application No. 1754550, filed May 23, 2017, the contents of such applications being incorporated by reference herein.

FIELD OF THE INVENTION

The technical field of the invention is the determination of the start of movement of a motor vehicle and more particularly the determination of such a start of movement by way of a system for monitoring the pressure of the tires of a motor vehicle.

BACKGROUND OF THE INVENTION

In the prior art, tire pressure monitoring systems (TPMS) comprise a TPMS receiver connected to the electronic control unit of the vehicle, and at least one TPMS emitter placed on a wheel of the vehicle. In general, each wheel of the vehicle is equipped with one TPMS emitter.

A TPMS emitter comprises a radiofrequency transmitter (operating at a frequency of 315 MHz or of 433.92 MHz depending on the country), a low-frequency receiver (operating at 125 kHz), a microcontroller, sensors and a battery.

The sensors generally comprise a pressure sensor, a temperature sensor, and an accelerometer.

The pressure sensor and the temperature sensor respectively allow the pressure and temperature of the air contained between the tire and the wheel rim to be measured.

The accelerometer allows the radial acceleration experienced by the wheel, and therefore the movement of the vehicle, to be determined.

However, the accelerometer is an expensive component, of consequential size and having a high power consumption.

SUMMARY OF THE INVENTION

There is therefore a need for a TPMS emitter that is more compact and less expensive.

There is also a need for a TPMS emitter of lower power consumption than existing emitters.

An aspect of the invention is a method for determining the start of movement of a motor vehicle equipped with at least one emitter for monitoring the pressure of a tire of a motor vehicle and with a receiver for monitoring the pressure of at least one tire, which is connected to an electronic control unit of the vehicle and able to communicate with the at least one emitter for monitoring the pressure, the communication between the monitoring receiver and each emitter for monitoring the pressure being subjected to a Doppler effect so that a periodic component is inserted into the signal emitted, by the emitter, to the receiver, the receiver comprising an intermediate filter being able to reconstruct an intermediate-frequency signal from the radiofrequency signal and from a reference signal, the intermediate-frequency signal being able to be demodulated by a computing means with a view to extracting data carried by the radiofrequency signal.

The method is noteworthy in that it comprises the following steps:

the intermediate-frequency signal is acquired, the fast Fourier transform of the intermediate-frequency signal is determined, the average value of the fast Fourier transform of the intermediate-frequency signal is determined over a preset duration, it is determined whether there is a frequency deviation by comparing the instantaneous value of the fast Fourier transform to the average value of the fast Fourier transform, if such is the case, it is determined whether the absolute value of the amplitude of the deviation is higher than a threshold, if such is the case, it is determined whether the deviation is periodic, if such is the case, it is determined that the frequency deviation corresponds to a periodic component inserted into the signal emitted by the emitter because of the Doppler effect, that the emitter for monitoring the pressure of a tire is moving and that the vehicle is moving.

To determine whether there is a frequency deviation depending on the instantaneous value of the fast Fourier transform and the average value of the fast Fourier transform, the following steps may be carried out:

the instantaneous value of the fast Fourier transform is subtracted from the average value of the fast Fourier transform, then it is determined whether the obtained signal is nonzero, if such is the case, it is determined that a frequency deviation is present.

The intermediate-frequency signal may be acquired when the emitter for monitoring the pressure of a tire is in a "low consumption" operating mode.

When it is determined that the vehicle is moving, the operating mode of the emitter for monitoring the pressure of a tire may be switched from a "low consumption" operating mode to a "driving" operating mode.

BRIEF DESCRIPTION OF THE DRAWINGS

Other aspects, features and advantages of the invention will become apparent on reading the following description, given solely by way of nonlimiting example, and with reference to the appended drawings, in which.

DETAILED DESCRIPTION OF THE PREFERRED EMBODIMENTS

Figure 1:
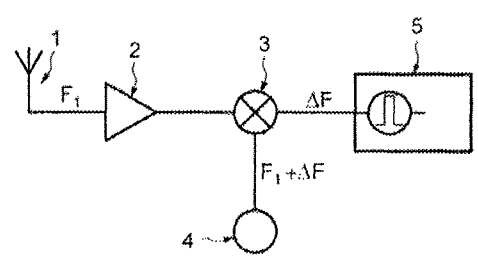
FIG. 1 illustrates a radiofrequency reception system of a TPMS receiver according to the prior art.

FIG. 1 illustrates a radiofrequency reception system of a TPMS receiver according to the prior art.

It may be seen that it comprises a reception antenna 1 connected to a parametric amplifier 2, which itself is connected to a mixer 3.

The mixer 3 is connected via another input to a phased-locked loop (PLL) referenced 4 and via its output to the intermediate filter 5 of a computing means.

The reception antenna 1 receives the radiofrequency signal and converts it into an electrical signal at a frequency F1, which signal is amplified by the parametric amplifier 2. The amplified signal is mixed with a frequency shift F1+ΔF received from the phase-locked loop 4 so as to generate a shifted signal at the frequency ΔF.

The shifted signal is processed by the intermediate filter 5, which reconstructs a time-dependent power signal that may then be processed in order to extract the data carried by the radiofrequency signal.

Figure 2:
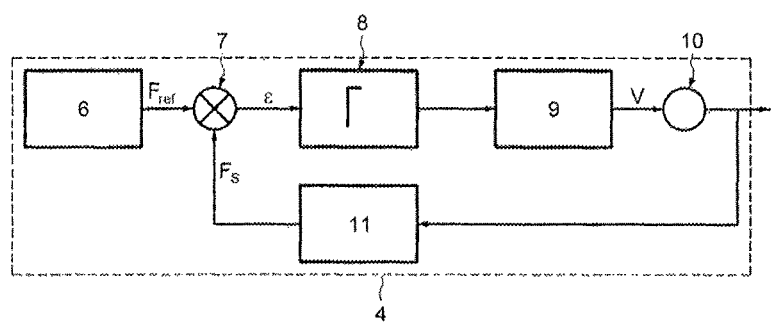
FIG. 2 illustrates a phase-locked loop according to the prior art.

FIG. 2 illustrates a phase-locked loop according to the prior art.

It comprises a means 6 for generating a reference frequency, which means is connected to the input of a phase comparator 7. The means for generating a reference frequency may be a quartz oscillator or a MEMS oscillator (MEMS being the acronym of MicroElectroMechanical System).

The output of the phase comparator 7 is connected to a low-pass filter 8, the output of which is connected to a charge pump 9. A voltage-controlled oscillator (VCO) referenced 10 is connected via its input to the charge pump 9 and via its output to the output of the phase-locked loop 4 and to a frequency divider 11, the frequency divider 11 being connected to an input of the comparator 7.

The means 6 for generating a reference frequency emits a signal at a reference frequency Fref. The phase comparator 7 determines a discrepancy £ depending on the phase discrepancy between the signal at the reference frequency Fref and the signal at the frequency Fs output from the frequency divider 11.

The error signal bearing the discrepancy c is then filtered with a low-pass filter 8 so as to remove the negative components therefrom.

The charge pump 9 generates a voltage V depending on the filtered signal, allowing the voltage-controlled oscillator 10 to be controlled so that it emits as output a signal the frequency of which is substantially constant and comprised in a frequency range centered on a multiple of the reference frequency dependent on the division coefficient of the frequency divider 11.

The inventors have observed that the frequency shift of the signal received at the input of the filter 5 comprises a component already present in the received radiofrequency signal in addition to the component ΔF inserted by the phase-locked loop.

After study, they observed that this component varied with the rotation of the TPMS emitter because of the Doppler effect. It will be recalled that the Doppler effect consists in a shift in the frequency of an electromagnetic emission because of the relative movement of the source with respect to a receiver.

An aspect of the invention aims to detect the start of movement of the TPMS emitter by determining a component due to the Doppler effect in the signal emitted by the TPMS emitter. It is thus possible to remove the accelerometer from such a TPMS emitter while ensuring the detection of the start of movement.

As was seen in the introduction, a TPMS emitter comprises a wireless transmission system for communicating with the TPMS receiver connected to the on-board control unit of the motor vehicle.

Each TPMS emitter is subjected to a circular movement because of its placement in a wheel with respect to the axis of said wheel, whereas the TPMS receiver remains in a fixed position in the vehicle. The circular movement experienced by the TPMS emitter induces a relative movement, making it get closer to the TPMS receiver in one half rotation of the wheel and get further away in the other half rotation.

When the emitter is getting closer to the receiver, the emission frequency experiences a first frequency shift defined by the following equation:

$$\Delta f_1 = f - fe_1 = f \cdot \left(1 - \frac{c}{(c + Vs)}\right) \quad \text{(Eq. 1)}$$

with:
c: the speed of light
Vs: the speed of movement of the emitter with respect to the receiver
f: the frequency of the wave emitted by the emitter.

When the emitter is getting further from the receiver, the emission frequency experiences a second frequency shift defined by the following equation:

$$\Delta f_2 = f - fe_2 = f \cdot \left(1 - \frac{c}{(c + Vs)}\right) \quad \text{(Eq. 2)}$$

Thus, depending on the speed of rotation and the dimensions of the vehicle, the signal emitted by the TPMS emitter experiences a periodic frequency shift.

By determining the simple presence of this additional frequency-shift component that has the signature of a Doppler effect and that is different from the component introduced by the phase-locked loop, it is possible to determine that the TPMS emitter is moving.

To do this, the signal at the input of the intermediate filter 5 is acquired.

Next, a fast Fourier transform (FFT) is carried out on the signal output from the intermediate filter 5.

Figure 3:
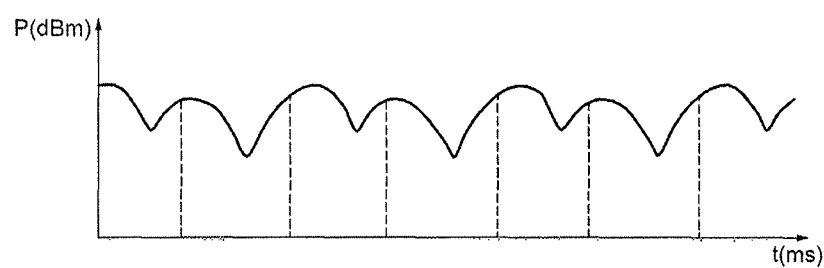
FIG. 3 illustrates the signal output from the intermediate filter of a TPMS receiver.
Figure 4:
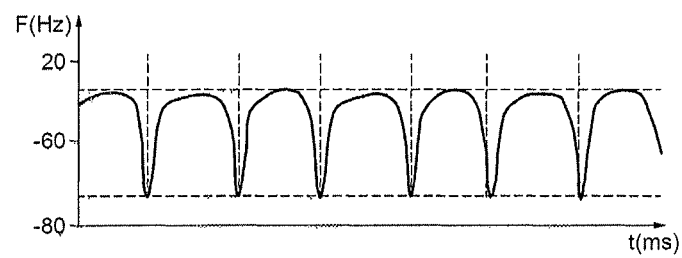
FIG. 4 illustrates the signal obtained as output from the fast Fourier transform of the intermediate-frequency signal.

By way of illustration, FIG. 3 illustrates the signal output from the intermediate filter 5 and FIG. 4 illustrates the corresponding signal output from the FFT. In the latter signal, the appearance of a periodic signal may be seen.

Figure 5:
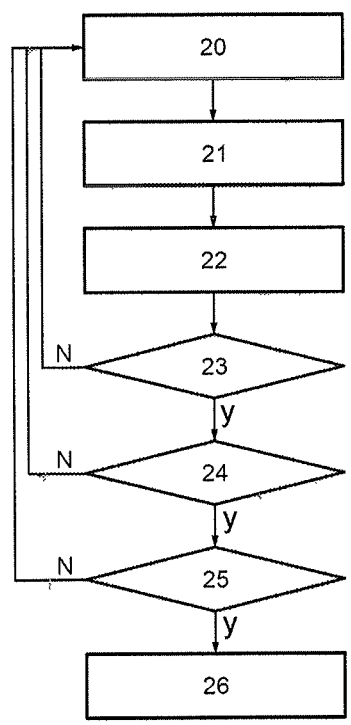
FIG. 5 illustrates the main steps of the method for determining the start of movement of a TPMS emitter according to one embodiment.

FIG. 5 illustrates the main steps of the method for determining the start of movement of a TPMS emitter.

In a first step 20, the signal output from the intermediate filter is acquired.

In a second step 21, the fast Fourier transform of the intermediate-frequency signal is determined.

In a third step 22, the average value of the fast Fourier transform of the intermediate-frequency signal is determined over a preset duration. The preset duration is chosen depending on the duration of the data frames received from the TPMS emitter, on the sampling throughput of said frames and on the time that passes between the emission of two successive frames. A person skilled in the art will understand that the detection of the presence of a frequency-shift component requires a sufficient amount of data. Specifically, the average value of the Fourier transform over the duration corresponding to the reception of the frames bearing the data is representative only for a significant amount of data. Thus, for frames of 10 ms emitted each 100 ms and having a sampling throughput comprised between 9.6 kb/s and 19.2 kb/s, the data contained in at least one frame are considered to allow an average value of the fast Fourier transform that is significant to be obtained.

In a fourth step 23, it is determined whether there is a frequency deviation by comparing the instantaneous value of the fast Fourier transform to the average value of the fast Fourier transform. This may be done by determining whether the subtraction of the signals is nonzero. If such is not the case, the method restarts at the first step 20.

If such is the case, the method continues with a fifth step 24 in which it is determined whether the absolute value of the amplitude of the deviation is higher than a threshold. If such is not the case, the method restarts at the first step 20.

If such is the case, the method continues with a sixth step 25 in which it is determined whether the deviation is periodic. If such is not the case, the method restarts at the first step 20.

If such is the case, the method continues with a seventh step 26 in which it is determined that the TPMS emitter is moving. It is deduced therefrom that the vehicle is moving. If such is not the case, the method restarts at the first step 20.

The method described above may interface with the periodic monitoring of the state of the tire that is carried out continuously at a preset frequency.

Because each data emission of such monitoring is expensive in terms of energy for the battery-powered TPMS emitter, a plurality of operating modes are generally employed in order to save its energy. Each of these modes comprises a modulation of the emission frequency and of the transmitted information. The operating modes are standardized and generally comprise at least one "parking" mode, a "low consumption" mode, and a "driving" mode.

Thus, the detection of the movement of the vehicle is required essentially to change between "low consumption" and "driving" operating modes.

Figure 6:
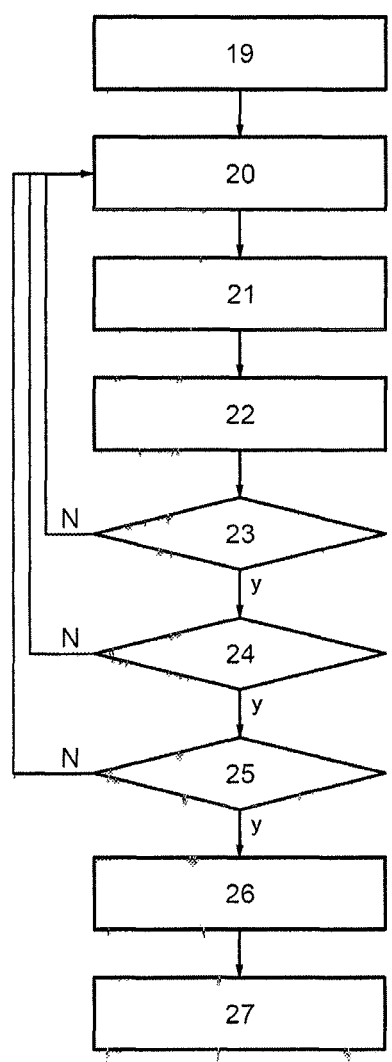
FIG. 6 illustrates the main steps of the method for determining the start of movement of a TPMS emitter according to another embodiment.

In this case, the method described with reference to FIG. 6 is periodically activated when the TPMS emitter is in "low consumption" mode in step 19. The detection that the vehicle is moving at the end of step 26 allows the TPMS emitter to switch to "driving" operating mode in step 27.

The invention claimed is:

1. A method for determining a start of movement of a motor vehicle equipped with at least one emitter for monitoring a pressure of a tire of the motor vehicle and with a receiver for monitoring the pressure of at least one tire, which is connected to an electronic control unit of the vehicle and able to communicate with the at least one emitter for monitoring the pressure, the method comprising:

subjecting the communication between the monitoring receiver and each emitter for monitoring the pressure to a Doppler effect so that a periodic component is inserted into a signal emitted, by the emitter, to the receiver, the receiver comprising an intermediate filter being able to reconstruct an intermediate-frequency signal from the radiofrequency signal and from a reference signal, demodulating the intermediate-frequency signal by a computing means with a view to extracting data carried by the radiofrequency signal, acquiring the intermediate-frequency signal, determining the fast Fourier transform of the intermediate-frequency signal, determining an average value of the fast Fourier transform of the intermediate-frequency signal over a preset duration, determining whether there is a frequency deviation by comparing the instantaneous value of the fast Fourier transform to the average value of the fast Fourier transform, if such is the case, determining whether the absolute value of the amplitude of the deviation is higher than a threshold, if such is the case, determining whether the deviation is periodic, and if such is the case, determining that the frequency deviation corresponds to a periodic component inserted into the signal emitted by the emitter because of the Doppler effect, that the emitter for monitoring the pressure of a tire is moving and that the vehicle is moving.

2. The method as claimed in claim 1, wherein, to determine whether there is a frequency deviation depending on the instantaneous value of the fast Fourier transform and the average value of the fast Fourier transform, subtracting the instantaneous value of the fast Fourier transform from the average value of the fast Fourier transform, then it is determined whether the obtained signal is nonzero, if such is the case, determining that a frequency deviation is present.

3. The method as claimed in claim 1, wherein the intermediate-frequency signal is acquired when the emitter for monitoring the pressure of a tire is in a "low consumption" operating mode.

4. The method as claimed in claim 1, wherein, when it is determined that the vehicle is moving, the operating mode of the emitter for monitoring the pressure of a tire is switched from a "low consumption" operating mode to a "driving" operating mode.

5. The method as claimed in claim 2, wherein the intermediate-frequency signal is acquired when the emitter for monitoring the pressure of a tire is in a "low consumption" operating mode.

6. The method as claimed in claim 2, wherein, when it is determined that the vehicle is moving, the operating mode of the emitter for monitoring the pressure of a tire is switched from a "low consumption" operating mode to a "driving" operating mode.

7. The method as claimed in claim 3, wherein, when it is determined that the vehicle is moving, the operating mode of the emitter for monitoring the pressure of a tire is switched from a "low consumption" operating mode to a "driving" operating mode.

* * * * *